United States Patent [19]

Rebhun

[11] 4,107,841
[45] Aug. 22, 1978

[54] WEED CUTTER CONSTRUCTION

[75] Inventor: Charles F. Rebhun, Austinburg, Ohio

[73] Assignee: True Temper Corporation, Cleveland, Ohio

[21] Appl. No.: 789,950

[22] Filed: Apr. 22, 1977

[51] Int. Cl.² ............................................. A01D 55/18
[52] U.S. Cl. ....................................... 30/276; 56/12.7
[58] Field of Search ......................... 30/276, 339, 347; 56/12.7, 295

[56] References Cited

U.S. PATENT DOCUMENTS

| | | | |
|---|---|---|---|
| 3,103,093 | 9/1963 | House | 56/295 |
| 3,320,733 | 5/1967 | Kirk | 56/295 |
| 3,670,413 | 6/1972 | Weber | 30/276 |
| 3,877,146 | 4/1975 | Pittinger | 30/276 |

*Primary Examiner*—Jimmy C. Peters

[57] ABSTRACT

Apparatus for cutting vegetation comprising a disc mounted for rotation in a generally horizontal plane, a support member protruding from the disc for receiving a cutting blade, an elongated, rigid plastic cutting blade pivotally mounted on the support member and a counterbalance to the cutting blade on the disc for stabilizing the apparatus; the cutting blade extending radially as the disc rotates, to cut vegetation in its path.

2 Claims, 5 Drawing Figures

U.S. Patent  Aug. 22, 1978  4,107,841
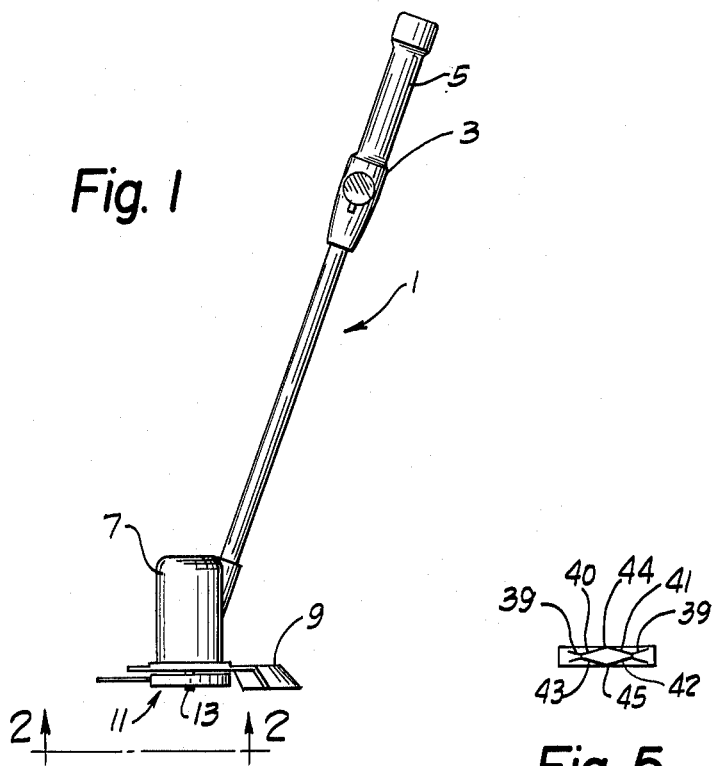
Fig. 1
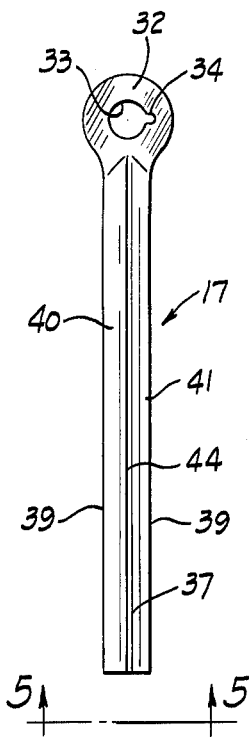
Fig. 4
Fig. 5
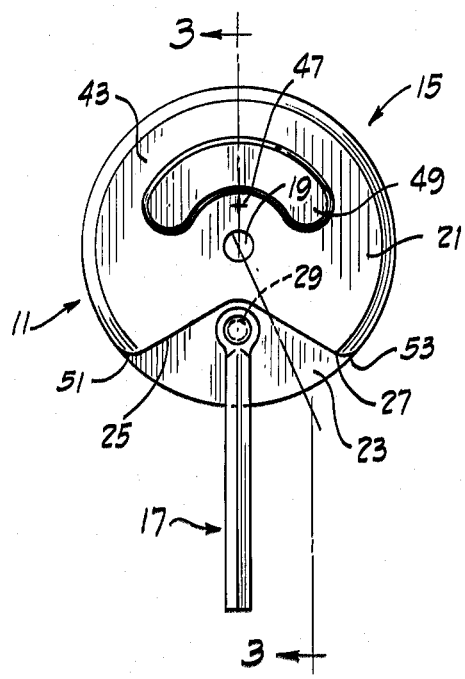
Fig. 2
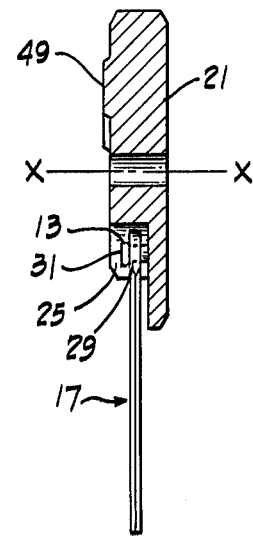
Fig. 3

WEED CUTTER CONSTRUCTION

The present invention relates to vegetation cutting apparatus, and in particular to power-driven, portable vegetation cutters. There has long been a need for a portable, high-speed implement for cutting light growths of vegetation such as weeds and grass in home gardens and in portions of lawns which are generally inaccessible to conventional lawn mowers. In response to this need, a variety of powered vegetation cutting devices have been devised which include rotatable support members from which extend one or more strands of flexible material such as monofilament line which whirl around in the manner of a flail, to cut vegetation in their path. The following group of U.S. Pat. Nos. are representative of the foregoing type of construction: 2,663,137; 2,708,335; 3,018,602; 3,208,209; 3,708,967; 3,826,068; 3,831,278; 3,859,776 and 3,928,911.

In another art, namely the field of lawn mowers, a variety of rotary lawn mowing devices are known which comprise a rotatable support element, and one or more cutting members pivotally mounted on the support element and adapted to extend radially outwardly in response to the rotation of the support element, to cut vegetation in their path of rotation. Thus, U.S. Pat. No. 2,484,511 discloses a rotary lawn mower having a central disc rotatable about a central axis, and having one or more metal blades mounted on the disc. The blades are freely pivotable and extend radially outwardly during the rotation of the disc. When the blade encounters an obstacle in its cutting path, the blade rebounds from the obstacle. Other U.S. patents directed to similar constructions are U.S. Pat. Nos. 3,320,732 and 3,320,733. U.S. Pat. No. 2,740,249 shows a similar arrangement wherein the cutting blades extend in a vertical direction when the carrier or support disc is at rest, and swing to a radial position under the influence of centrifugal force when the disc is rotated. U.S. Pat. Nos. Re. 24,811; 2,529,797; 2,737,772; 2,770,115; 2,856,747; 2,867,963; 2,889,677; 2,916,867 and 2,963,844 disclose various lawn mowers having blades which are pivotally mounted on rotating carrier discs and which are urged radially outwardly from the discs in response to the rotation of the respective discs. When so moved, the blades are displaced into a cutting position and are adapted to rebound in the event that they strike an obstruction.

U.S. Pat. No. 3,389,464 describes a rotary hedge clipper having balancing weights which serve as counterweights for a cutting blade. U.S. Pat. No. 3,670,430 shows rotary blades which are snap-fit on a mounting hub. A grass trimmer having a flat rotary blade mounted between a pair of retaining fingers is described in U.S. Pat. No. 3,877,146.

Despite this profusion of patent disclosures of various vegetation cutting implements, there continues to be a need for an effective portable vegetation apparatus which can cut light vegetation on gardens and lawns in areas generally inaccessible to conventional lawn mowers and the like. Current portable weed cutting devices, exemplified by the foregoing patents which incorporate a strand which whirls about in the manner of a flail, suffer various disadvantages. The strand is very flexible which limits the cutting strength thereof. Since the strand is continuously consumed during cutting operations, means must be provided for storing an ample supply of the strand and for paying out sequential lengths thereof. Such metering devices are generally complicated and add both to the cost of the apparatus and the sources of malfunctioning thereof. If automatic metering means are not provided, the strand material must be manually withdrawn, thus causing inconvenience to the user. Furthermore, in replacing an exhausted supply of the strand material, the user would generally be required to purchase a oreloaded cartridge or to load the unit manually, also adding to the cost and convenience of the device. Known lawn mowing devices are compatible with the problem at hand because they are heavy and bulky and normally quite dangerous. In fact, any cutting device which incorporates metal cutting implements is inherently dangerous, primarily because of the speed at which the cutting element moves through its cutting path.

It is an object of the present invention to provide an improved apparatus for cutting light vegetation in gardens and lawns and the like, particularly in areas inaccessible to conventional lawn mowers.

Another object of the present invention is to provide a portable apparatus for cutting light vegetaton which is safe to use.

Another object of the present invention is to provide a portable apparatus for cutting light vegetation which incorporates a readily replaceable and inexpensive cutting element.

Yet a further object of the present invention is to provide a light, effective, portable, high-speed apparatus of the foregoing types which is economical to manufacture and not readily susceptible to mechanical malfunction.

Other objects will be apparent from the description to follow and from the appended claims.

The present invention provides a portable apparatus for cutting light vegetation which comprises a rotatable support disc having a substantially rigid cutting blade pivotally and eccentrially mounted thereon, the cutting blade moving radially outwardly from the axis of rotation of the disc and through a circular path relative to that axis for cutting the vegetation. The cutting blade is preferably readily attachable to the support disc and is a relatively inexpensive item.

Turning now to the drawings,

FIG. 1 is a side view of a vegetation cutting apparatus according to the invention;

FIG. 2 is a bottom plan view taken in the direction 2—2 as indicated in FIG. 1;

FIG. 3 is a side view, partly in section, taken in the direction 3—3 shown in FIG. 2;

FIG. 4 is a plan view of a cutting blade for the apparatus shown in FIGS. 1-3; and FIG. 5 is a view taken in the direction 5—5 indicated in FIG. 4.

The preferred embodiment of the invention described below comprises a plastic support disc mounted to a drive shaft to rotate the disc about its central axis, the disc having a recessed portion and a protrusion extending therefrom, and a replaceable, elongated cutting blade having an aperture at one end dimensioned and configured to snap on the protrusion. The cutting blade pivots radially outwardly from the central axis of the disc in response to the rotation of the disc, and rotates with the disc to cut vegetation in its path. The cutting blade is loosely mounted on the protrusion and is limited in its range of movement by abutment surfaces which define the boundary between the recessed portion of the support disc and the raised portion of the disc. The blade bounces from obstacles in its path to prolong the life of the blade. Blades are readily replaced by virtue of the snap fitting.

Turning now to the drawings, FIG. 1 shows an apparatus 1 according to the invention for cutting light vegetation. This apparatus includes a handle 3 with a hand grip 5, a motor 7 (which can conveniently be electrically powered by means of a battery source or from a power line, or the motor could be an internal combustion engine), a cover plate or shield 9, and a cutting assembly 11 mounted for rotation on a drive shaft 13.

Referring next to FIGS. 2 and 3, cutting assembly 11 includes a support disc 15 and a cutting blade 17. Support disc 15 comprises a unitary plastic member having a circular periphery and a central opening 19 through which drive shaft 13 extends. The means by which drive shaft 13 is attached to support disc 15 has been omitted from the drawings for the sake of clarity. Support disc 15 further includes a relatively thick first portion 21, a relatively thin second portion or recess 23, and a central axis X-X, which is the axis of rotation of the disc. A pair of abutment surfaces or walls 25 and 27 defind the boundary between portions 21 and 23. Attachment means in the form of a protrusion or lug 29 is provided in portion 23, preferably disposed equidistant from walls 25 and 27 and adjacent the periphery of support disc 15. Protrusion 29 includes a cylindrical stem and an enlarged head 31 for receiving and retaining cutting blade 17.

As shown particularly in FIGS. 4 and 5, cutting blade 17 is an elongated member having, at one end, a widened portion 32 through which extends a generally circular opening 33 having a contiguous smaller opening 34. Opening 33 is dimensioned to receive the stem portion of protrusion 29 with sufficient clearance to allow cutting blade 17 to swing freely on the protrusion while retaining the blade thereon. The smaller opening 34 enables cutting blade 17 to be snap-fit over enlarged head 31 so that cutting blade 17 can readily be manually attached to, and removed from, protrusion 29. Cutting blade 17 is a substantially rigid plastic member which has sufficient flexibility to enable the foregoing attachment of the blade to the support disc without the exertion of undue effort. The flexibility of blade 17 does not impair its cutting ability, since the blade behaves as a rigid body when it rotates with disc 15 as explained below. Cutting blade 17 includes an elongated portion 37 which is flattened as illustrated in FIG. 5 to define cutting edges 39 extending along opposite sides of portion 37. More specifically, portions 37 has a diamond-shaped cross-section defined by bevel surfaces 40-43 extending from rounded ridges 44, 45 on the upper and lower faces of the blade, to the respective cutting edges 39. The upper and lower faces of cutting blade 17 are conveniently identical, whereby the cutting blade can be attached to disc 15 without regard to the disposition of those faces relative to the disc.

In order to assure the stability of cutting assembly 11, support disc 15 is constructed to counterbalance the weight of cutting blade 17, and render the center of gravity of assembly 11 at axis X—X. Accordingly, the center of gravity 47 of the disc is radially spaced from the axis X—X by providing a thickened portion 49 on the opposite part of disc 15 from portion 23.

Support disc 15 is mounted for rotation in a generally horizontal plane on drive shaft 13. The side or face of assembly 11 shown in FIG. 2 is disposed on the upper side of the assembly as viewed in FIG. 1 so that cutting blade 17 is on the upper surface of support disc 15.

Support disc 15 rotates with the rotation of drive shaft 13, and cutting blade 17 extends radially outwardly from axis X—X when disc 15 rotates. As disc 15 rotates about its axis, radially extending cutting blade 17 swings through a circular path and severs vegetation located in its path. Whenever cutting blade 17 encounters an obstruction which it cannot sever, the blade rebounds to reduce the likelihood of damage thereto. The path of movement of blade 17 relative to disc 15 is confined to an arc defined by abutment surfaces 25 and 27. These surfaces are rounded at their juncture with the periphery of disc 15 as indicated by numerals 51 and 53 so that sharp corners which could chip or sever cutting blade 17 are not present. Although most motors 7 are unidirectional, it is significant that assembly 11 can be rotated in either direction since cutting blade 17, portion 23, and surfaces 25 and 27 are symmetrical about the cutting blade in its extended position.

The invention described above accomplishes the objects of the invention and achieves significant advantages over the prior art. The support disc and cutting blade can be fabricated very economically such as by the injection molding of high density of polyethylene in appropriately constructed dies. Both the support disc and the cutting blade can be fabricated as unitary members. Cutting blade 17 is particularly inexpensive, and the destruction or loss of cutting blades would be of little consequence to the user who could replace the blades by simply snapping a new blade on the attachment protrusion. The apparatus is very safe to use since the cutting blades are fabricated from relatively soft materials and are adapted to rebound upon striking obstacles which are not readily severable. The support shield 9 which is not part of the present invention, provides an added safeguard protecting the user of the device.

The invention has been described in detail with particular reference to the preferred embodiment thereof, but it will be understood that variations and modifications within the spirit and scope of the invention may occur to those skilled in the art to which the invention pertains.

I claim:

1. Apparatus for cutting vegetation, said apparatus comprising:

a support disc including mounting means for mounting the disc for rotation in a generally horizontal plane about an axis, support means offset from said axis for receiving a single cutting blade, and counterbalance means for stabilizing said disc and any attachments thereon;

said support disc comprises a first portion having a relatively large thickness in the direction of said axis and a second portion having a relatively small thickness in the direction of said axis, the juncture of said first and second portions being defined by abutment surfaces, and said support means being disposed in said second portion; and said blade being an elongated, substantially rigid plastic cutting blade including attachment means disposed at one end of said cutting blade for attaching said cutting blade to said support means for pivotal movement, said cutting blade extending radially outwardly from said axis and rotating about said axis in response to the rotation of said support disc to cut vegetation disposed in the path of said blade; and said cutting blade being restricted to a predetermined range of movement within said second portion by said abutment surface.

2. Apparatus according to claim 1 wherein said cutting blade is formed of plastic and of diamond-shaped cross-section and comprises an elongated portion terminating in a free end and including identical upper and lower faces, cutting edges extending along opposite sides of said elongated portion, and the diamond-shaped cross-section defined by bevel surfaces extending between the respective cutting edges and central ridges extending along the respective upper and lower faces of said elongated portion.

* * * * *